(12) United States Patent
Frehner et al.

(10) Patent No.: US 9,038,985 B2
(45) Date of Patent: May 26, 2015

(54) VACUUM VALVE

(71) Applicant: VAT Holding AG, Haag (CH)

(72) Inventors: Hanspeter Frehner, Sevelen (CH); Claudio Zanetti, Igis (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 14/068,092

(22) Filed: Oct. 31, 2013

(65) Prior Publication Data
US 2014/0117264 A1    May 1, 2014

(30) Foreign Application Priority Data

Oct. 31, 2012   (EP) ................................. 12007459

(51) Int. Cl.
*F16K 31/122*   (2006.01)
*F16K 51/02*    (2006.01)
*F16K 3/18*     (2006.01)

(52) U.S. Cl.
CPC ......... *F16K 31/1221* (2013.01); *F16K 31/1225* (2013.01); *F16K 51/02* (2013.01); *F16K 3/18* (2013.01)

(58) Field of Classification Search
CPC ... F16K 3/18; F16K 31/1221; F16K 31/1225; F16K 51/02
USPC .................................. 251/193–204, 62–63.6
See application file for complete search history.

(56) References Cited

U.S. PATENT DOCUMENTS

| | | | | |
|---|---|---|---|---|
| 5,755,255 | A | * | 5/1998 | Iwabuchi ....................... 251/158 |
| 6,045,117 | A | * | 4/2000 | Tamura et al. ................. 251/193 |
| 6,056,266 | A | * | 5/2000 | Blecha .......................... 251/158 |
| 6,416,037 | B1 | * | 7/2002 | Geiser .......................... 251/158 |
| 6,431,518 | B1 | | 8/2002 | Geiser |
| 6,454,241 | B2 | * | 9/2002 | Tamura et al. ................. 251/193 |
| 7,066,443 | B2 | | 6/2006 | Ishigaki |
| 7,234,679 | B2 | * | 6/2007 | Ishigaki ........................ 251/195 |
| 2008/0017822 | A1 | * | 1/2008 | Schoen et al. ................. 251/158 |
| 2010/0090145 | A1 | | 4/2010 | Maerk |

FOREIGN PATENT DOCUMENTS

DE    102008051349    11/2009
EP    0684415         8/1999

* cited by examiner

*Primary Examiner* — John Bastianelli
(74) *Attorney, Agent, or Firm* — Volpe and Koenig, P.C.

(57) ABSTRACT

A valve, in particular a vacuum valve, in which, in order to close a passage opening, in particular of the valve, at least one closure member can be moved by a valve drive, starting from a maximum open position, in which the closure member opens the passage opening at least partially, first on a first partial path into an intermediate position, and the closure member can be moved, starting from the intermediate position, on at least one second partial path which is angled away from the first partial path into a closed position, in which the closure member closes the passage opening, the valve drive having at least two cylinder spaces which are loadable in each case with a pressure medium, at least one piston being mounted displaceably in each of the cylinder spaces, and the pistons being supported on one another by way of at least one prestressing element.

15 Claims, 2 Drawing Sheets

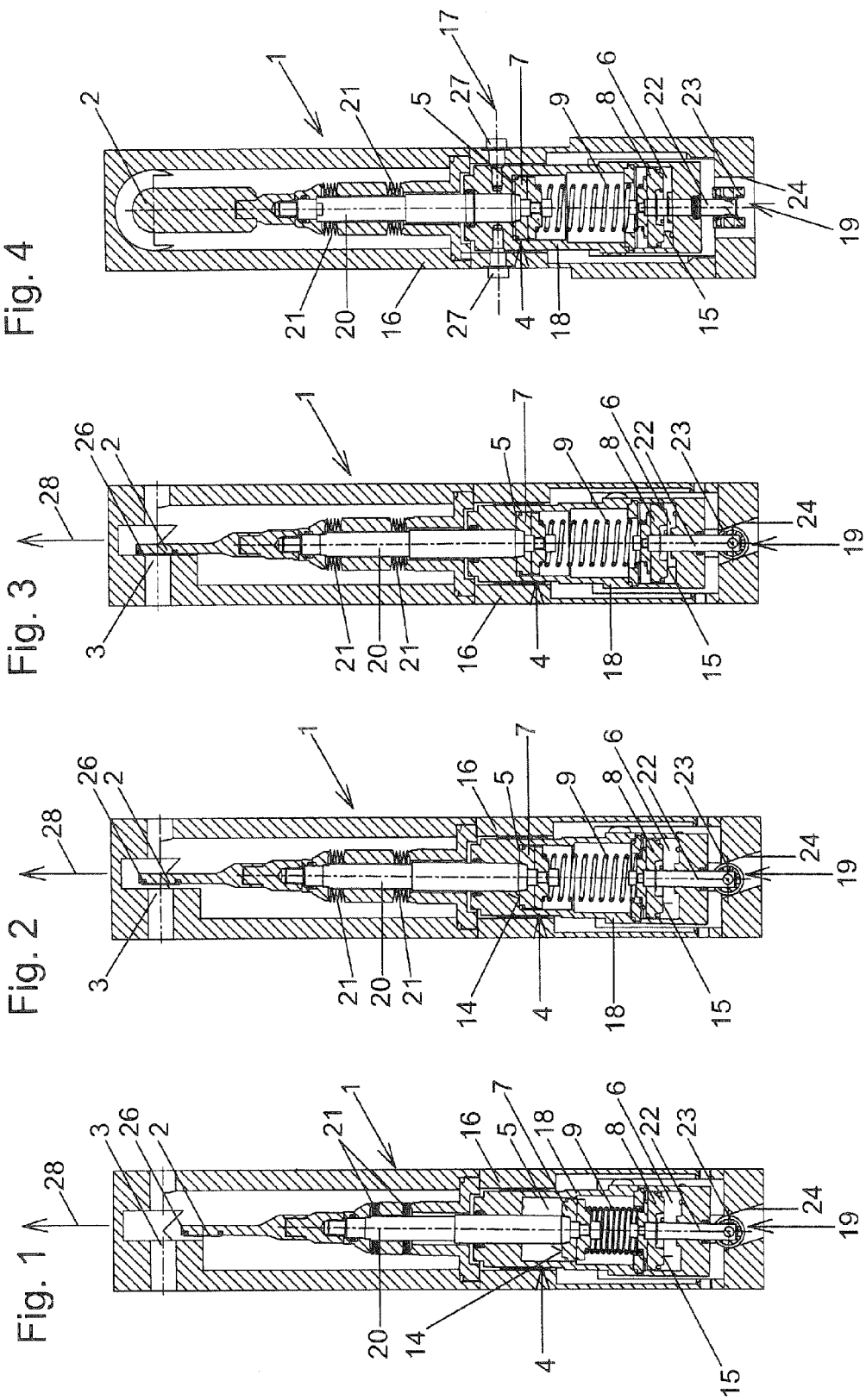

VACUUM VALVE

INCORPORATION BY REFERENCE

The following documents are incorporated herein by reference as if fully sect forth: European Appln No. 12007459.6, Filed Oct. 31, 2012.

BACKGROUND

The present invention relates to a valve, in particular a vacuum valve, in which, in order to close at least one passage opening, in particular of the valve, at least one closure member of the valve can be moved by means of a valve drive of the valve, starting from a maximum open position, in which the closure member opens the passage opening at least partially, first of all on a first partial path into an intermediate position, and the closure member can be moved, starting from the intermediate position, on at least one second partial path which is angled away from the first partial path into a closed position, in which the closure member closes the passage opening, the valve drive having at least two cylinder spaces which can be loaded in each case with a pressure medium.

In valves of the generic type, it is provided that the closure member runs through at least two partial paths on its travel from the maximum open position into the closed position, said two partial paths being angled away with respect to one another. On a first partial path, the closure member is moved from the maximum open position into an intermediate position. On the second partial path, the movement of the closure member into its closed position then takes place, in which closed position it then as a rule closes and/or seals the passage opening. In the prior art, solutions are known, in which the valve drive which is used for this purpose has at least two cylinder spaces which can be loaded in each case with a pressure medium.

A construction of the generic type of a valve is disclosed in EP 0 684 415 B1.

SUMMARY

It is an object of the invention to provide an alternative type of the valve drive for valves of the generic type.

For this purpose, it is provided according to the invention that at least one piston is mounted displaceably in each of the cylinder spaces, and the pistons are supported on one another by way of at least one prestressing element, preferably a spring element.

According to the invention, the two pistons which are mounted displaceably in each case one of the cylinder spaces are therefore connected to one another directly or indirectly via a prestressing element. Here, the prestressing element acts both on the one piston and on the other piston. In this context, it is favorably provided that the prestressing element prestresses or presses the pistons in each case against the pressure medium which is present in the respective cylinder space, preferably in the direction away from one another. Apart from unavoidable frictional forces during the guidance of the pistons, the movement of the pistons is favorably defined exclusively by the interaction of the pressures of the pressure medium and the loading by means of the prestressing element. First of all, in principle everything, by way of which prestress can be generated or by way of which corresponding pressure can be exerted on the pistons, can be used as a prestressing element. In this context, they can therefore also be prestressing elements which can be actuated by means of external pressure or energy sources, such as piston/cylinder units, electric motors, linear motors and the like. However, the prestressing element is particularly preferably a spring element. Spring elements generally mean elastic elements which are deformed elastically in the case of a corresponding compressive loading or tensile loading and return automatically elastically into their initial shape and/or position again when the external forces stop. The prestressing elements are preferably, for example, mechanical springs such as leaf springs, helical springs and the like. However, gas springs or corresponding elastomer bodies or the like can also be used.

In principle, both gases and liquids and also mixtures thereof, with which the cylinder spaces can be loaded, may be suitable as pressure medium. They are particularly preferably valves which are operated pneumatically, that is to say operated with gas. Normal ambient air which can be pressurized correspondingly is available here, for example, particularly inexpensively as pressure medium.

The closure member can be configured in a very wide variety of ways as in the prior art. It can be, for example, a valve head. There are usually corresponding seals on the closure member or on the seat which interacts with said closure member in the closed position, by way of which seals the closure member bears in the closed position against a seat which surrounds the passage opening. It is also to be mentioned that the passage opening and also the seat which surrounds it do not necessarily have to be an integral part or part of the valve. In the sense of a complete compact overall design, however, it is favorable if the passage opening and/or the seat which surrounds the passage opening are/is part of the valve.

It is favorably provided that the closure member opens the passage opening completely in its maximum open position. In the intermediate position between the first and second partial paths, the closure member can then already be moved, for example, to a greater or lesser extent into congruence with the passage opening, without closing the latter sealingly. The actual closure, preferably the sealing closure, of the passage opening is then only present in the closed position. This intermediate position marks the transition from the first into the second partial path. This transition can be recognized by the fact that the closure member performs a change in direction during the transition from the first to the second partial path and vice versa. In this context, the partial paths are therefore arranged such that they are angled away with respect to one another. The two partial paths can lie orthogonally or obliquely with respect to one another at another angle at least in the immediate surroundings of the intermediate position. At any rate, they are not arranged in parallel or coaxially with respect to one another in the sense of being angled away; rather it is important that the closure member experiences a change in direction during the transition between the partial paths, which does not necessarily presuppose an acute angle.

Particularly preferred embodiments of the invention provide that the cylinder spaces are connected to one another by means of a common pressure line for the pressure medium. It is particularly preferably provided here that the pressure line is open permanently or in all operating states. As a result, the cylinder spaces for the pressure medium are then also connected to one another permanently. It is possible in said embodiments to load both cylinder spaces with pressure by means of only one pressure source and to discharge the pressure by means of only one pressure outlet. This favorably takes place via the common pressure line. In this context, preferred variants of the invention provide that the cylinder spaces are connected in a first operating state to a pressure source in order to move the closure member from the closed position into the maximum open position, and are connected in a second operating state to a pressure outlet in order to move the closure member from the maximum open position into the closed position. This prestressing element can then press the pistons apart from one another in said second operating state, in order thus to move the closure member from the maximum open position into the closed position. This all favorably takes place via the common pressure line. The switchover between the operating states can favorably take place via a corresponding control valve. Preferred variants of the invention which can be realized particularly simply provide that, during the operation of the valve, preferably permanently, the same pressure prevails in the one of the cylinder spaces as in the other of the cylinder spaces. In order to guide the closure member in a targeted manner on the respective partial paths during the opening and also closing operation, particularly preferred variants of the invention provide that the pistons have piston faces of different sizes which are loaded in each case by means of the pressure medium in the respective cylinder space. It can thus be provided, for example, that the piston with the smaller piston face is connected to the closure member in order to move the closure member on the first partial path. This is favorably a rigid connection between said piston with the smaller piston face and the closure member. This rigid connection can be realized, for example, via a corresponding rod. It is achieved in this way that, during the closing operation, the closure member is first of all moved on the first, preferably linear, partial path.

It is also favorable in this context if the piston with the larger piston face is connected to a part of a slotted guide in order to move the closure member on the second partial path. A corresponding angling-away operation or directional change of the second partial path with respect to the first partial path can then be achieved via the slotted guide. This embodiment can then also achieve a situation where the movement on the second partial path takes place only when the closure member has reached the abovementioned intermediate position, that is to say the first partial path has been traveled completely. Suitable slotted guides are known per se in the prior art. They are positive guides which stipulate a certain type of movement.

In preferred embodiments of the invention, the slotted guides lead to a pivoting movement. In the case of a pivoting movement of this type, it is favorably provided that the second partial path is of curved configuration. In the context of said pivoting movement, it can also be provided that the valve drive has at least one pivot pin which is stationary with regard to a valve housing of the valve and on which the cylinder or cylinders which has/have the cylinder spaces is/are mounted pivotably.

It is also to be noted that each cylinder space can be realized in a dedicated cylinder. These cylinders can then be connected to one another, preferably rigidly. It is provided in preferred variants, however, that the two cylinder spaces are realized in a common cylinder. Both pistons are then also guided in said common cylinder. The prestressing element is then also situated as a rule in said common cylinder.

In preferred embodiments, the first partial path is of linear configuration. The second partial path is of curved configuration in preferred variants.

BRIEF DESCRIPTION OF THE DRAWINGS

Further features and design variants of the invention will be explained in the following text by way of example using one concrete embodiment of the invention. In the drawing:

FIGS. 1 to 3 show longitudinal sections through the design variant according to the invention of the valve along the sectional line AA shown in FIG. 6, FIG. 4 shows a longitudinal section along the sectional line BB shown in FIG. 6.

DETAILED DESCRIPTION OF THE PREFERRED EMBODIMENTS

Figure 5:
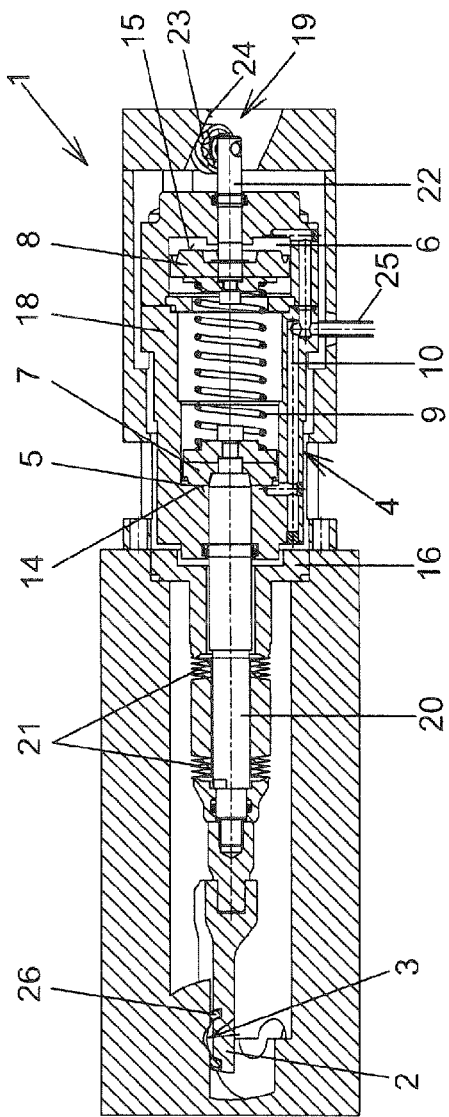
FIG. 5 shows a longitudinal section along the diagonal sectional line CC shown in FIG. 6.

In FIG. 1, the closure member 2 is situated in its maximum open position, in which it opens the passage opening 3 completely in this exemplary embodiment. In FIG. 2, an intermediate position is reached at the end of the first partial path, in which intermediate position, although the closure member 2 already lies in congruence with the passage opening 3, it does not yet close said passage opening 3. FIG. 3 shows the closed position, in which the closure member 2 bears, with its seals 26 here, against the seat which surrounds the passage opening 3, in such a way that the passage opening 3 is sealed.

On the first partial path, starting from FIG. 1 toward the intermediate position according to FIG. 2, the closure member 2 carries out a purely linear movement on the first partial path in this exemplary embodiment. During the movement from the intermediate position according to FIG. 2 into the closed position according to FIG. 3, the closure member 2 follows a second partial path of curved configuration, by the entire valve drive 4 including closure member 2 being pivoted relative to the valve housing 16 about the pivot pin 17. To this end, as can be seen particularly well in FIG. 4, the valve drive 4 or its common cylinder 18 is mounted in the valve housing such that it can pivot about the pivot pin 17 by means of the axle pins 27.

In the exemplary embodiment which is shown, the closure member 2 is connected rigidly via the rod 20 to the piston 7 which is mounted displaceably in the cylinder space 5 of the cylinder 18 which is common here. That piston face 14 of the piston 7 which can be loaded with pressure by means of the pressure medium which is present in the cylinder space 5 is smaller than that piston face 15 of the other piston 8 which can be loaded with pressure by means of the pressure medium which is present in the other cylinder space 6. The two pistons 7 and 8 which are mounted displaceably in the cylinder spaces 5 and 6 are supported on one another and also prestressed by means of the prestressing element 9. The prestressing element 9 which is configured in the form of a helical spring here presses the two pistons 7 and 8 in the direction away from one another in each case against the pressure medium which is present in the respective cylinder space 5 and 6. Whereas the piston 7 with the smaller piston face 14 is connected rigidly to the closure member via the rod 20, the piston 8 with the larger piston face 15 is connected to a part of the slotted guide 19. The part of the slotted guide 19 in this exemplary embodiment is the roller 23 which is mounted rotatably on the rod 22 and is guided in the guide piece 24 which is oblique here with respect to the longitudinal direction of the valve 1. In this exemplary embodiment, the rod 22 is connected rigidly to the piston 8.

In the exemplary embodiment which is shown, the cylinder spaces 5 and 6 are connected to one another via the common pressure line 10. This is a permanent pressure line 10, that is to say one which is open in all operating states, which pressure line 10 ensures that the cylinder spaces 5 and 6 are connected to one another permanently. This achieves a situation where, during the operation of the valve 1, the same pressure prevails permanently in the one of the cylinder spaces 5 as in the other of the cylinder spaces 6. The pressure line 10 and its connections to the cylinder spaces 5 and 6 can be seen particularly well in the diagonal section according to FIG. 5.

The feed line 25 which can be seen in FIG. 5 opens into said common pressure line 10, via which feed line 25 the cylinder spaces 5 and 6 can be loaded with pressure by introducing pressure medium, such as compressed air, other gases or liquids, for example. The pressure discharge likewise takes place via the common pressure line 10 and the feed line 25 which is also an outflow line in this connection.

Figure 7:
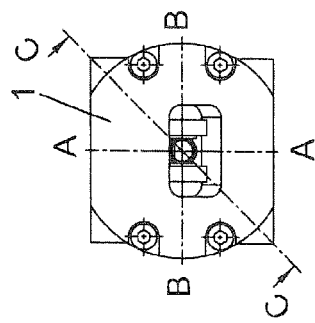
FIG. 7 shows a schematic circuit diagram of one preferred variant for pressure loading of the cylinder spaces.
Figure 6:
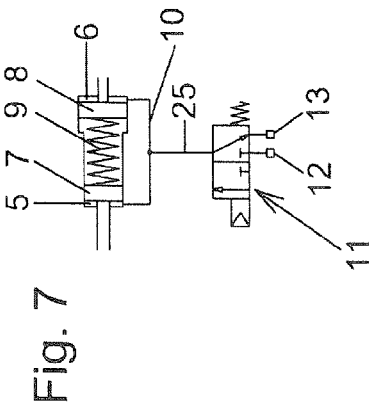
FIG. 6 shows a plan view, in which the various sectional lines are illustrated.

In a schematic circuit diagram, FIG. 7 shows how the cylinder spaces 5 and 6 can be loaded with pressure and how the pressure can be discharged from them again. In this exemplary embodiment, this takes place via the common pressure line 10, the feed line 25 and the control valve 11 which is arranged therein. In the position which is shown in FIG. 7, the control valve 11 connects the cylinder spaces 5 and 6 to a pressure outlet 13. The latter can be, for example, under normal atmospheric pressure, with the result that pressure medium can be discharged accordingly out of the cylinder spaces 5 and 6. In order to load the cylinder spaces 5 and 6 with pressure medium, the control valve 11 is transferred into a position (not shown here), in which it connects the pressure source 12 to the cylinder spaces 5 and 6, with the result that the latter are loaded with pressure medium from the pressure source 12. The pressure source 12 and pressure outlet 13 can be realized in all embodiments which are known per se from the prior art and are suitable. This applies both to gaseous and to liquid pressure media. In conjunction with FIG. 7, it is also to be noted that the control valve 11 can also assume intermediate positions, in which the cylinder spaces 5 and 6 are connected neither to the pressure source 12 nor to the pressure outlet 13. In said positions, the respective pressure medium is then shut in the respective cylinder space 5 and 6.

In the following text, the method of operation of the valve drive 4 of this exemplary embodiment will be explained.

In the maximum open position according to FIG. 1, the pressure medium which is under positive pressure is shut in the cylinder spaces 5 and 6. The pistons 7 and 8 are moved toward one another and the prestressing element 9 is compressed. In order to initiate the closing operation, the control valve 11 is then moved into its position which is shown in FIG. 7, in which the cylinder spaces 5 and 6 are connected to the pressure outlet 13. As a result, it becomes possible that pressure medium can flow out of the cylinder spaces 5 and 6, while the prestressing element 9 presses the pistons 7 and 8 apart from one another. Due to the smaller piston face 14 which is loaded with pressure at an otherwise identical internal pressure in the cylinder spaces 5 and 6, the piston 7 with the smaller piston face 14 moves first of all. In the process, it pushes the closure member 2, via the rigid connection in the form of the rod 20, along the first partial path linearly into the intermediate position which is shown in FIG. 2. The sealing bellows 21 are pulled apart from one another in the process. Only when the intermediate position is reached does the prestressing element 9 press the piston 8 with the greater piston face 15 which is loaded with pressure more deeply into the cylinder space 6. As a result, the roller 23 which is connected via the rod 22 to the piston 8 is moved along the guide piece 24 which is arranged obliquely with respect to the longitudinal direction 28, as a result of which pivoting of the cylinder 18 or the valve drive 4 about the pivot pin 17 occurs.

As a result, the closure member 2 is moved from the intermediate position which is shown in FIG. 2 along the second partial path of curved configuration into the closed position according to FIG. 3. With this, the closing operation is then terminated.

For opening purposes, that is to say to move the closure member 2 from the closed position according to FIG. 3 via the intermediate position according to FIG. 2 into the maximum open position according to FIG. 1, the control valve 11 is set in such a way that the cylinder spaces 5 and 6 are connected to the pressure source 12. If this is the case, first of all the cylinder space 6 is filled with pressure medium, as a result of which the piston 8 with the larger piston face 15 is moved in the direction toward the closure member 2. As a result, the roller 23 of the slotted guide 19 once again runs along the guide piece 24 which is oriented obliquely with respect to the longitudinal direction 28 of the valve 1, as a result of which the common cylinder 18 is pivoted about the pivot pin 17, as a result of which the closure member 2 moves along the second partial path of curved configuration from the closed position according to FIG. 3 into the intermediate position according to FIG. 2. Subsequently, pressure medium then enters into the cylinder space 5, as a result of which the piston 7 is then also moved downward with continuation of the compression of the prestressing element 9, with the result that the closure member 2 moves along the linear first partial path in the direction toward the maximum open position which is shown in FIG. 1. The depicted sequence of movement results on account of the piston faces 14 and 15 of different size, despite both cylinder spaces 5 and 6 in each case being under the same pressure.

For the sake of completeness, it is also noted that it does not necessarily have to be provided that the cylinder spaces 5, 6 are loaded with the same pressure and the piston faces 14, 15 of the pistons 7, 8 are of different size. In particular in the case of loading with different pressures, other variants are also conceivable which, however, can only be realized with more outlay as a rule, in order to realize the described movement sequences of the closure member 2.

The technology according to the invention can be used for a very wide variety of types of valves 1. It can be used particularly preferably in what is known as vacuum technology. In this context, the valve 1 can also be called a vacuum valve. In general, vacuum technology is spoken about from pressures which are smaller than 1 mbar or 100 Pa.

LIST OF DESIGNATIONS

1 Valve
2 Closure member
3 Passage opening
4 Valve drive
5 Cylinder space
6 Cylinder space
7 Piston
8 Piston
9 Prestressing element
10 Common pressure line
11 Control valve
12 Pressure source
13 Pressure outlet
14 Piston face
15 Piston face
16 Valve housing
17 Pivot pin
18 Cylinder
19 Slotted guide 20 Rod
21 Bellows
22 Rod
23 Roller
24 Guide piece
25 Feed line
26 Seal
27 Axle pin
28 Longitudinal direction

The invention claimed is:

1. A valve for closing at least one passage opening, comprising:
   at least one closure member that is movable by a valve drive, starting from a maximum open position, in which the closure member opens the passage opening at least partially, first of all on a first partial path into an intermediate position, and the closure member is movable, starting from the intermediate position, on at least one second partial path which is angled away from the first partial path into a closed position, in which the closure member closes the passage opening, the valve drive having at least two cylinder spaces which are loadable in each case with a pressure medium, wherein at least one piston is mounted displaceably in respective ones of the cylinder spaces, and the pistons are supported on one another by at least one prestressing element.

2. The valve as claimed in claim 1, wherein the cylinder spaces are connected to one another by a common pressure line for the pressure medium.

3. The valve as claimed in claim 1, wherein the cylinder spaces are connected in a first operating state to a pressure source, in order to move the closure member from the closed position into the maximum open position, and are connected in a second operating state to a pressure outlet in order to move the closure member from the maximum open position into the closed position.

4. The valve as claimed in claim 1, wherein, during operation of the valve, a same pressure prevails in the one of the cylinder spaces as in the other of the cylinder spaces.

5. The valve as claimed in claim 1, wherein the pistons have piston faces of different sizes which are loaded in each case by the pressure medium in the respective cylinder spaces.

6. The valve as claimed in claim 5, wherein the piston with a smaller piston face is connected to the closure member in order to move the closure member on the first partial path.

7. The valve as claimed in claim 5, wherein the piston with a larger piston face is connected to a part of a slotted guide in order to move the closure member on the second partial path.

8. The valve as claimed in claim 1, wherein the first partial path extends linearly.

9. The valve as claimed in claim 1, wherein the valve drive has at least one pivot pin which is stationary with respect to a valve housing of the valve and on which at least one of the cylinders which have the cylinder spaces is mounted pivotably.

10. The valve as claimed in claim 1, wherein the prestressing element prestresses or presses the pistons in each case against the pressure medium which is present in the respective cylinder space.

11. The valve as claimed in claim 1, wherein the prestressing element is a spring.

12. The valve as claimed in claim 2, wherein the cylinder spaces are permanently connected to one another by the common pressure line which is permanently open.

13. The valve as claimed in claim 3, wherein the cylinder spaces are connected in the first operating state to the pressure source at least one of the common pressure line or via a control valve.

14. The valve as claimed in claim 1, wherein the second partial path is curved.

15. The valve as claimed in claim 1, wherein the prestressing element prestresses or presses the pistons in each case against the pressure medium which is present in the respective cylinder space in a direction away from one another.

* * * * *